Jan. 8, 1952 G. C. AHIER ET AL 2,581,780

METHOD AND MEANS FOR PHASE AND FREQUENCY MODULATION

Filed Oct. 15, 1946

INVENTOR:
GEORGES CHARLES AHIER
ET. AL.
By: Young, Emery & Thompson
Attys.

Patented Jan. 8, 1952

2,581,780

UNITED STATES PATENT OFFICE 2,581,780

METHOD AND MEANS FOR PHASE AND FREQUENCY MODULATION

Georges Charles Ahier, Montmorency, and Paul Buffet, Saint-Didier-au-Mont-d'Or, France Application October 15, 1946, Serial No. 703,382
In France October 23, 1945

9 Claims. (Cl. 332—2)

This invention relates to a method and means for modulating as to phase and frequency high frequency oscillating electric currents.

In most modulation methods applied to frequency modulation there are certain inherent drawbacks. These drawbacks are due to the intricacy of the circuit accompanying the stabilised pilot circuit or are due to the instability of the frequency when for instance the pilot circuit is modulated by means of a reactance tube. The instability of these tubes destroys the stability of the pilot circuit and variations of its resistance produce an undesirable modulation as to amplitude. The present invention removes these drawbacks through the use of a pilot circuit whose frequency is stabilised by known means and is not effected by or dependent on the system of modulation applied thereto.

This invention has for its object a method and means for the frequency and phase modulation of electrical waves as obtained through a modification of the distance travelled over by the waves preferably but not exclusively after transformation into disturbances moving at a comparatively low speed, said modification in distance producing a Doppler and phase modulation effect.

This invention will now be described with reference to the accompanying drawings which are taken by way of examples. In said drawings.

Figure 1:
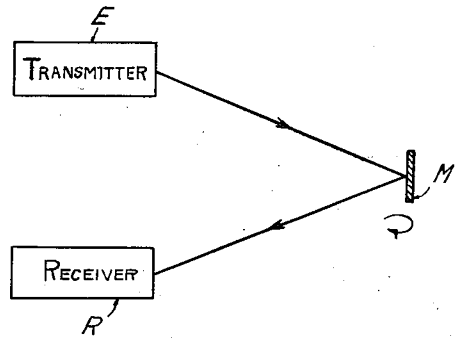
Fig. 1 illustrates a diagram of the invention in its most simple theoretical case.

It will be easy to understand the principle underlying our invention when considering its application to the theoretical case illustrated diagrammatically in Fig. 1.

Between a transmitter of undamped waves E which, by way of example is assumed to be wireless waves used in the transmission system to be modulated in frequency and in phase, and the corresponding receiver R, there is arranged a movable mirror M. Through any known means, the mirror is given, in a direction perpendicular to its surface, a rectilinear reciprocating movement the frequency of which is at each moment the same as that of the modulating frequency. Under such conditions, the receiver R receives a modulated wave as to frequency by reason of the Doppler effect, and as to phase by reason of the periodical variations in the optic path separating the transmitter from the receiver.

Obviously the example chosen has no other object than to further the following disclosure and it is possible to reach the same conclusion whatever may be the nature of the wave considered on one hand and the relation between the movement of the mirror and the frequency spectrum of the modulating phenomenon. It will be ascertained similarly that the use of a mirror does not limit in any way the application of this principle to the case of the reflection of the wave considered and that this case of reflection has been chosen only by reason of the simplicity of the disclosure.

The principle of an improved modulating method being disclosed under its simplest form, it may now be found that certain waves are more capable of being used for its application.

Thus for obtaining a substantial modulation effect, on the wireless waves considered in the above example, it will be necessary to give the mirror a movement having an elongation and a translational speed which is difficult to imagine in practice.

In contradistinction, and according to a feature of the present invention, it may be noticed, that certain types of waves are easily used for the execution of our invention because they require only elongations and speeds for the movements of the mirror which may be practically obtained without any difficulty. Among the types of waves to which the present invention is advantageously applicable, there is mentioned the ultra sound waves the speed of propagation of which is of a magnitude consistent with the values which may be assumed by the elongation and speed of the movement of a reflecting blade submitted to vibrations at audio frequency.

According to one form of an ultra sound modulator according to the present invention, there is used an ultra-sound vat, the two opposite surfaces of which are formed by piezo-electric quartz blades executed in the usual manner. One of the quartz blades is energized by a high frequency oscillation which generates inside the vat ultra sound waves energizing in their turn at the same frequency the other quartz blade, which latter blade is on the other hand started vibrating under the action of variations in pressure applied for instance at audio-modulating frequencies.

In the following description, there will now be described an example of application of the invention to a modulating system making use of ultra sounds.

Figure 2:
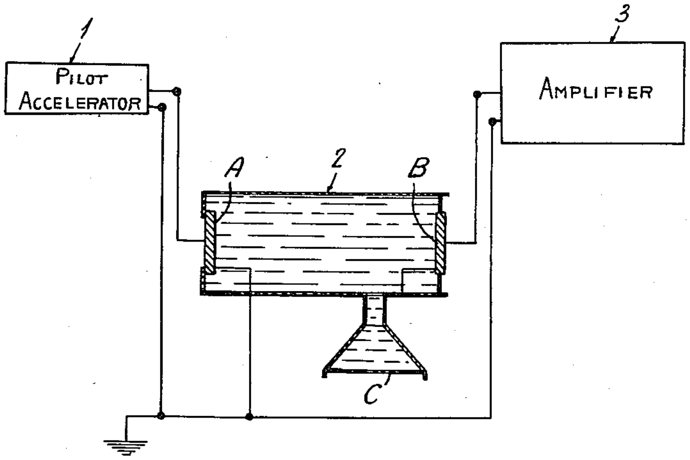
Fig. 2 illustrates the diagram of one possible form of execution of the invention.

A pilot oscillator shown at 1 in Fig. 2 and stabilised for instance by a piezo-electric quartz energizes at a high frequency the insulated surface of a piezo-electric quartz A forming one of the sides of the modulating vat 2, the opposite side of which incorporates a second quartz B secured to the vat 2 through an elastic fitting. The vibrations of the quartz A produce an ultrasound wave advancing inside the elastic medium filling the vat and constituted for instance by distilled water, which elastic medium transmits the high frequency movements to the quartz B. The electric oscillations produced inside this latter quartz are transmitted to an amplifier 3 and are directed through the usual circuits to a transmitting aerial.

In this vat 2, the modulating mirror is constituted by the quartz B to which there is applied variations in pressure in accordance with the low frequency modulation through any suitable or known electric or mechanical means.

In the example considered, these variations in pressure are generated inside the medium filling the ultra sound vat under the action of the deformation of a microphonic membrane C. The vibrations of this membrane thus transmitted to the quartz B produce, by reason of the elasticity of the supports of said quartz, variations in the position of the reflecting surface which oscillates at the same frequency as the membrane C. The distance between A and B varies periodically and the high frequency wave energizing the quartz B is thus phase modulated. It is also modulated as to frequency through the Doppler effect with a depth which is all the greater when the blade B is more damped for high frequency vibration and may thus oscillate over a larger band of frequencies.

Obviously the execution of this modulation system requires the precautions generally suitable for such wiring diagrams and consisting in particular in suitably defining the stationary undamped waves and in constituting the elements of the modulating system in a manner such that its response curve may be linear with reference to the modulating frequencies so as to avoid any distortion. The characteristics of the system are of course selected in a manner such that the efficiency may be independent of the frequency in the modulating frequency range. It is thus possible to obtain a true reproduction of the frequencies throughout the extent of this range.

It is apparent from the above that the invention results in the following advantages:

(1) The absence of any reaction of the modulation system on the high frequency generating circuit which provides perfect stability for the latter.

(2) The simplicity of the execution of the modulating circuit in particular in the case of the use of an ultra sound wave modulator.

Although the invention has been described with reference to a particular form of execution, obviously this by no means is intended to limit its field of application. Further, the invention is not limited either to the forms of execution disclosed more particularly hereinabove and illustrated in accompanying drawings and it includes any modification thereof falling within the scope of accompanying claims.

What we claim is:

1. A method for transmitting intelligence consisting in generating high frequency electric carrier waves, transducing said carrier waves piezoelectrically into supersonic waves, retransducing said supersonic waves back into high frequency oscillations and modulating the operative length of travel of the supersonic waves in accordance with the intelligence to be transmitted.

2. An arrangement for conveying intelligence comprising a generator of high frequency electric carrier waves, piezoelectric means adapted to transduce the waves generated thereby into supersonic waves, further piezoelectric means located at a normally constant distance from the first piezoelectric means and adapted to retransduce the supersonic waves back into high frequency electric waves and pressure controlled means adapted to modulate the constant distance between the two piezoelectric means in accordance with the intelligence to be conveyed.

3. In the transmission of intelligence through phase and frequency modulation, the steps consisting in generating an electric high frequency carrier wave, converting said carrier wave into non-electric oscillations, modulating said non-electric modulations by means of an undamped pressure wave and reconverting the non-electric oscillations thus modulated into a modulated high frequency wave for further transmission.

4. In the transmission of intelligence through phase and frequency modulation, the steps consisting in generating an electric high frequency carrier wave, converting said carrier wave into supersonic oscillations, modulating said supersonic oscillations by means of an undamped pressure wave and reconverting the supersonic oscillations thus modulated into a modulated high frequency wave for further transmission.

5. In a system for transmitting intelligence through frequency and phase modulation, the combination of a generator of undamped high frequency electric oscillations, modulating means including a homogeneous liquid path, means for converting the electric oscillations into a supersonic wave inside said liquid path and means for applying an undamped modulating pressure wave to said supersonic wave, and means for reconverting the modulated supersonic wave into high frequency electric oscillations.

6. In a distant control system operating on phase and frequency modulated high frequency waves, the combination of a generator of high frequency carrier waves, a generator of supersonic waves energized by said high frequency waves, a finite volume of a homogeneous liquid through which said supersonic waves are adapted to be propagated, means for applying to said liquid volume a modulated undamped pressure wave, a generator of high frequency modulated electric waves energized by said phase and frequency modulated supersonic waves and a load circuit for transmitting the high frequency modulated waves fed by said last mentioned generator.

7. A transmitter for a distant control system comprising in combination a stabilized generator of high frequency electric carrier waves, a generator of supersonic waves energized by said generator, a liquid containing vat through which said supersonic waves are transmitted, a generator of pressure waves responsive to incoming signals, means for applying said pressure waves to the liquid in the vat for modulating the supersonic waves therein, means for reconverting the frequency and phase modulated supersonic waves into correspondingly modulated high frequency electric waves.

8. A communication system comprising a transmitting station including a stabilized pilot oscillator of high frequency waves, means for phase and frequency modulating the high frequency waves generated by said oscillator including a vat, a homogeneous liquid mass inside said vat, a couple of piezoelectric plates carried by opposite walls of said vat, means for energizing the first of said plates through the high frequency oscillator for producing supersonic oscillations in the liquid, the other plate being adapted to receive said supersonic oscillations and to retransform them into high frequency electric oscillations, a diaphragm in the wall of the vat near the second plate, means for applying thereto pressure waves corresponding to signals to be transmitted, said pressure waves being transmitted through the liquid from the diaphragm to mechanically vibrate the second piezoelectric plate and phase and frequency modulating thereby the supersonic oscillations received by said plate and a high frequency transmission circuit adapted to be fed by the high frequency electric oscillations correspondingly modulated produced by the second piezoelectric plate.

9. A communication system comprising a transmitting station including a stabilized pilot oscillator of high frequency waves, means for phase and frequency modulating the high frequency waves generated by said oscillator including a vat, a homogeneous liquid mass inside said vat, a couple of piezoelectric plates carried by opposite walls of said vat, the first one of which is rigidly secured to the vat and the second is yieldingly mounted thereon, means for energizing the first of said plates through the high frequency oscillator for producing supersonic oscillations in the liquid, means including pressure sensitive means for modulating the supersonic oscillations passing through the vat in accordance with incoming signals and a high frequency transmission circuit in which said second piezoelectric plate is inserted and adapted to transmit the modulated supersonic oscillations of the latter in the form of correspondingly modulated electric oscillations.

GEORGES CHARLES AHIER.
PAUL BUFFET.

REFERENCES CITED

The following references are of record in the file of this patent:

UNITED STATES PATENTS

| Number | Name | Date |
|---|---|---|
| 1,864,638 | Chilowsky | June 28, 1932 |
| 1,933,735 | Hund | Nov. 7, 1933 |
| 2,210,015 | Usselman | Aug. 6, 1940 |
| 2,248,870 | Langevin | July 8, 1941 |
| 2,263,902 | Percival | Nov. 25, 1941 |
| 2,408,816 | Shapiro | Oct. 8, 1946 |
| 2,483,768 | Hershberger | Oct. 4, 1949 |

FOREIGN PATENTS

| Number | Country | Date |
|---|---|---|
| 252,387 | Great Britain | Dec. 2, 1926 |